(No Model.)
J. BENTLEY.
SCREW STOCK.
No. 327,223. Patented Sept. 29, 1885.
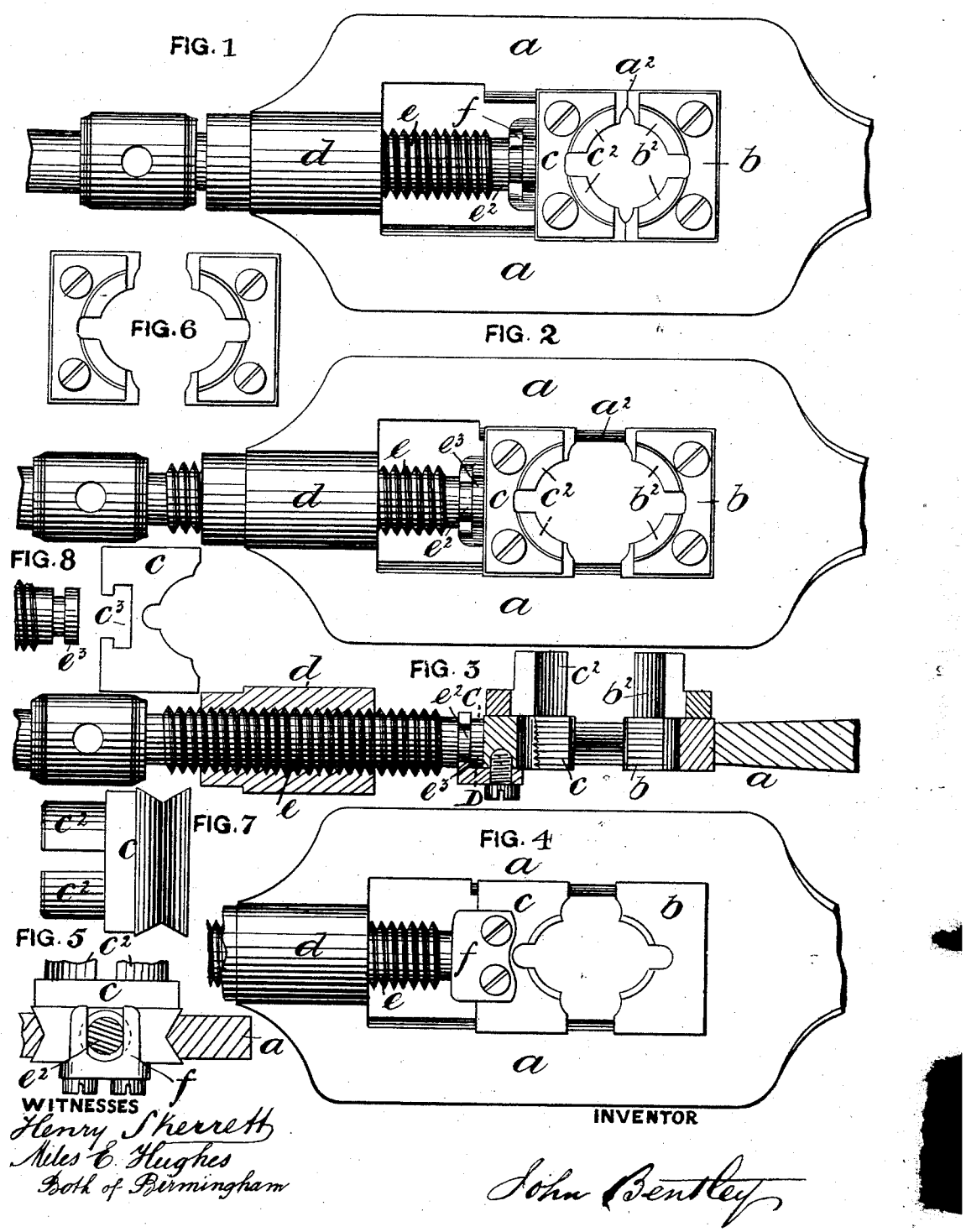

UNITED STATES PATENT OFFICE.

JOHN BENTLEY, OF BIRMINGHAM, COUNTY OF WARWICK, ENGLAND.

SCREW-STOCK.

SPECIFICATION forming part of Letters Patent No. 327,223, dated September 29, 1885.

Application filed August 7, 1885. (No model.) Patented in England December 27, 1884, No. 16,935.

*To all whom it may concern:*

Be it known that I, JOHN BENTLEY, a subject of the Queen of Great Britain, residing at Birmingham, in the county of Warwick, England, manufacturer, have invented Improvements in Screw-Stocks and other like Screwing Appliances, (for which I have applied for Letters Patent in Great Britain, No. 16,935, dated December 27, 1884,) of which the following is a specification.

My invention consists in the combination, with the half-dies or die-segments of a screw-stock or screw-forming device, of guides attached thereto and adjustable therewith, as hereinafter described and claimed.

In carrying out my invention the guides are made in halves or in segments, respectively affixed to the half-dies of the screw-stock by pins, rivets, or by any other suitable means— that is, the guide consists of a short tube or sleeve divided longitudinally or in segments, which are respectively attached to and move with the half-dies, thereby rendering the guide adjustable to suit any required diameter or size of object to be threaded, the axis of the half-guides always remaining perfectly concentric with the axis of the cutting-orifice inclosed between the half-dies. Thus the change of position of the half-die to thread a greater or less object never disturbs the concentricity of the guide with respect to the cutting-edges of the dies. By making guides thus adjustable, so as to embrace or truly encircle the object to be threaded, it constitutes a true guide and rest, and the objects threaded by the screw stock or guides provided with such a guide are both true and efficiently cut.

The means for carrying back a half-die on the screwing back of the feed-screw are as follows: The feed-screw for advancing the half-die for bringing it upon its work may be an independent screw which passes through the frame of the stock, which may be oblique or otherwise; or the feed-screw may be made upon the end or a continuation of one of the handles of the stock. The terminal inner end of the feed or advancing screw is connected to the back of a half-die, so that on rotating either in one or other direction of the feed-screw, the half-die is made to advance or retire from the other half-die, consequent upon the diameter of object to be wormed, so that the half-die is made to slide backward or forward while the feed-screw or object moving it rotates. The connection between the movable half-die and the end of the feed-screw or other advancing expedient is effected by a clutch-like piece, which lies within a cut-away part in the back of the die, so that the requisite motion or drawing back is effected as described. A like connection may be effected by inserting the end of the feed-screw into a hole or cavity in the back of the die, and connecting the parts together by a lateral screw-pin, which takes into a groove or annular depression formed near the end thereof; and, further, the end of the feed-screw may have a circular boss which takes into a suitably-shaped hole in the back of the die. By such means the withdrawal of the half-die is effected in a simple and efficient manner, so that the cutting-edges of the movable die can be taken out of the threads of the object threaded without the necessity of reversing the stock or causing the cutting-edges of the dies to travel again over the thread already cut.

I will now proceed to describe, with reference to the accompanying drawings, the manner in which the same is to be performed.

Figure 1 is a front elevation of a screw-stock provided with improvements made according to my invention, the threading-dies being closed. Fig. 2 is the same with the dies open or the traversing-die withdrawn by the screw which gives the retiring or advancing motion. Fig. 3 is a longitudinal vertical section. Fig. 4 is a back elevation of the stock and dies, showing how the connection is formed between the feed-screw and the traversing half-die. Fig. 5 is a transverse section on the dotted lines C D, showing how the fork-like clutch embraces the neck on the feed-screw. Fig. 6 shows a front elevation of the half-dies and their guides separately, and Fig. 7 is an end view of one of the half-dies and the segmental guides carried by it. Fig. 8 is a detail view, representing the end of the feed-screw and the movable half-die with which the same is connected.

The same letters of reference indicate corresponding parts in the several figures of the drawings.

*a* is the body or frame of the stock, which is one of the ordinary kind.

*b* is a stationary half-die fitting within the rectangular opening $a^2$. This half-die carries guides $b^2\ b^2$ standing from the face of the said die. *c* is a movable half-die, which also carries segmental guides $c^2\ c^2$ like those on the stationary die. These guides form steadying-rests for giving lateral support to a tube or rod to be wormed, so that these guides or lateral rests are portions of the segment of a circle which move with and form a part of the dies themselves—that is, they are incapable of moving other than with the dies, and therefore always preserve that concentricity which is necessary for the perfect screwing or worming of an object in whatever position the dies may be with respect to each other.

*d* is a screw-box wherein the traversing die-screw *e* works. The inner terminal end, $e^3$, of the said screw *e* is connected to the movable die *c* by a clutch or fork-like connector, *f*, which connects the said die to the end of the operating-screw—that is, the clutch *f* is connected to the die by screws or otherwise, and to the end of the operating-screw by a forked end, $f^2$, which embraces the neck $e^2$, as best seen in Fig. 5; or the end of the screw may be connected to the die by the end $e^3$ of the latter taking into a similarly-shaped recess, $c^3$, in the former, as represented in Fig. 8, which compels the die to travel with the end of the screw in whatever direction the screw may be operated.

By such means the withdrawal of the half-die is effected in a simple and efficient manner without the necessity of reversing the stock or causing the cutting-edges of the dies to travel again over a worm already cut, as is common with stocks of the ordinary construction where no means are devised for taking the cutting-edges out of the threads of an object wormed.

The application of my invention to other screwing appliances differs in no essential respect from its application to a screw-stock already described.

Having now particularly described and ascertained the nature of my said invention, and in what manner the same is to be performed, I declare that what I claim is—

1. The combination, in a screw-stock having open dies, of segmental guides $b^2\ b^2$ and $c^2\ c^2$ carried by half-dies *b c*, one of which is movable, so as to preserve the perfect concentricity of the guide or the segments composing it, with respect to the screwing-orifice, substantially as described and set forth.

2. In screw-stocks having relatively-adjustable guides attached to half-dies or segments one of which is adjustable, the combination of the operating-screw with the guides and dies, and the connector *f*, substantially as described.

Dated this 14th day of July, 1885.

JOHN BENTLEY.

Witnesses:
 HENRY SHERRETT,
 MILES E. HUGHES,
  *Both of Birmingham.*